United States Patent
Fleming, III

(10) Patent No.: US 8,056,861 B2
(45) Date of Patent: Nov. 15, 2011

(54) INTELLIGENT BALLISTIC PARACHUTE SYSTEM WITH FUEL DISCHARGE

(76) Inventor: Hoyt A. Fleming, III, Boise, ID (US)

( * ) Notice: Subject to any disclaimer, the term of this patent is extended or adjusted under 35 U.S.C. 154(b) by 438 days.

(21) Appl. No.: 12/352,683

(22) Filed: Jan. 13, 2009

(65) Prior Publication Data

US 2010/0176244 A1   Jul. 15, 2010

(51) Int. Cl.
*B64D 17/00*   (2006.01)
(52) U.S. Cl. .............. 244/139; 244/136; 244/100 R; 244/134 R
(58) Field of Classification Search ............... 244/139, 244/136, 100 R, 102 R, 134 R, 134 B, 134 C
See application file for complete search history.

(56) References Cited

U.S. PATENT DOCUMENTS

| | | | |
|---|---|---|---|
| 4,441,673 A * | 4/1984 | Muscatell | 244/135 R |
| 4,480,807 A | 11/1984 | Bowen | |
| 4,863,119 A | 9/1989 | Case et al. | |
| 6,808,144 B1 * | 10/2004 | Nicolai et al. | 244/139 |
| 7,523,891 B2 | 4/2009 | Hakki et al. | |
| 7,871,043 B2 | 1/2011 | Smith et al. | |
| 2008/0087766 A1 * | 4/2008 | Leutard et al. | 244/102 R |
| 2010/0004803 A1 | 1/2010 | Manfredi et al. | |

* cited by examiner

*Primary Examiner* — J. Woodrow Eldred

(57) ABSTRACT

A method performed by an aircraft, the aircraft including a wing, aircraft fuel, and a whole-aircraft parachute that is coupled to the aircraft. The method comprises: deploying the whole-aircraft parachute while the aircraft is in flight; and after deploying the parachute, but before the aircraft contacts the earth or any object coupled to the earth, discharging at least a portion of the aircraft fuel from the wing of the aircraft.

24 Claims, 10 Drawing Sheets

INTELLIGENT BALLISTIC PARACHUTE SYSTEM WITH FUEL DISCHARGE

FIELD OF THE INVENTION

This invention relates to whole aircraft parachute systems.

BACKGROUND OF THE INVENTION

The safety of the occupants of an aircraft is of the utmost importance. Thus, aircraft manufacturers are constantly adding safety improvements to their aircraft. One of the recent aircraft safety improvements added to aircraft is a whole-aircraft ballistic parachute system. According to Ballistic Recovery Systems, Inc., over 200 lives have been saved by whole-aircraft ballistic parachute systems. One embodiment of a prior art aircraft with a whole-aircraft ballistic parachute system is shown in FIG. 1. The aircraft 100 includes a fragile parachute cover 105. When the whole-aircraft parachute is deployed, a rocket fires through the cover 105 and extracts the whole-aircraft parachute from an opening under the cover. The rocket then tensions the parachute harness straps. Next, the whole-aircraft parachute inflates. After the whole-parachute inflates, the aircraft is lowered to the earth.

FIG. 2 shows a prior art whole-aircraft parachute harness. The forward straps 110 and the rear straps 115, both of which are made of a light but strong flexible material, such as KEVLAR™, couple the aircraft fuselage to a whole-aircraft parachute canopy (not shown) via the straps 120.

While the above whole-aircraft ballistic parachute system has saved many lives, the safety of aircraft occupants can still be further increased.

DETAILED DESCRIPTION OF THE INVENTION

Figure 1:
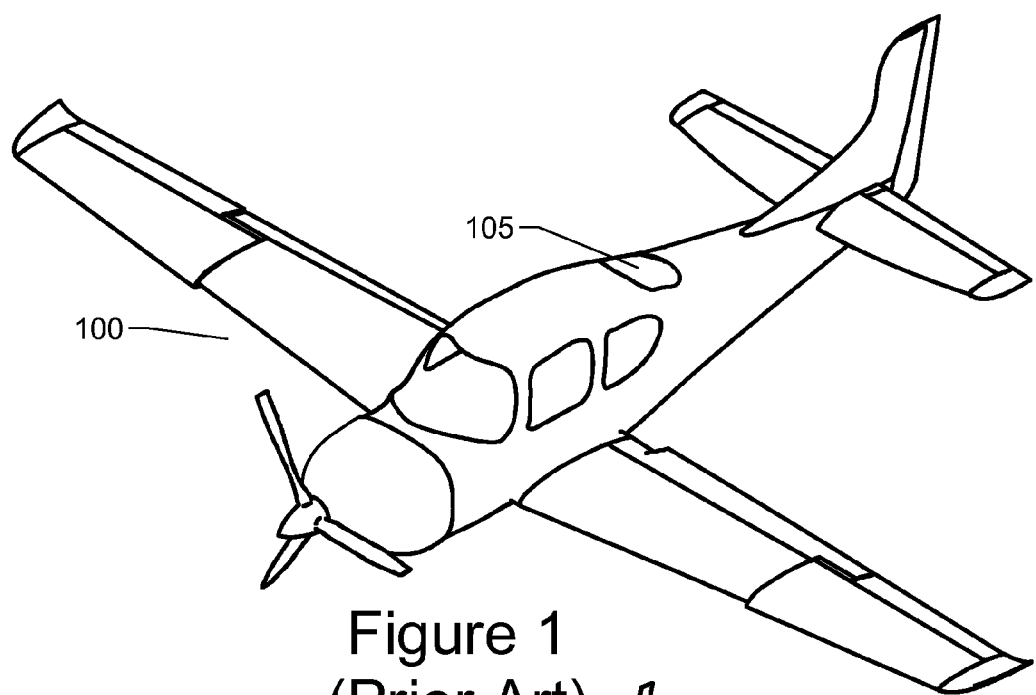
FIG. 1 is a view of a prior art aircraft with a whole-aircraft ballistic parachute system, which has not been deployed.
Figure 2:
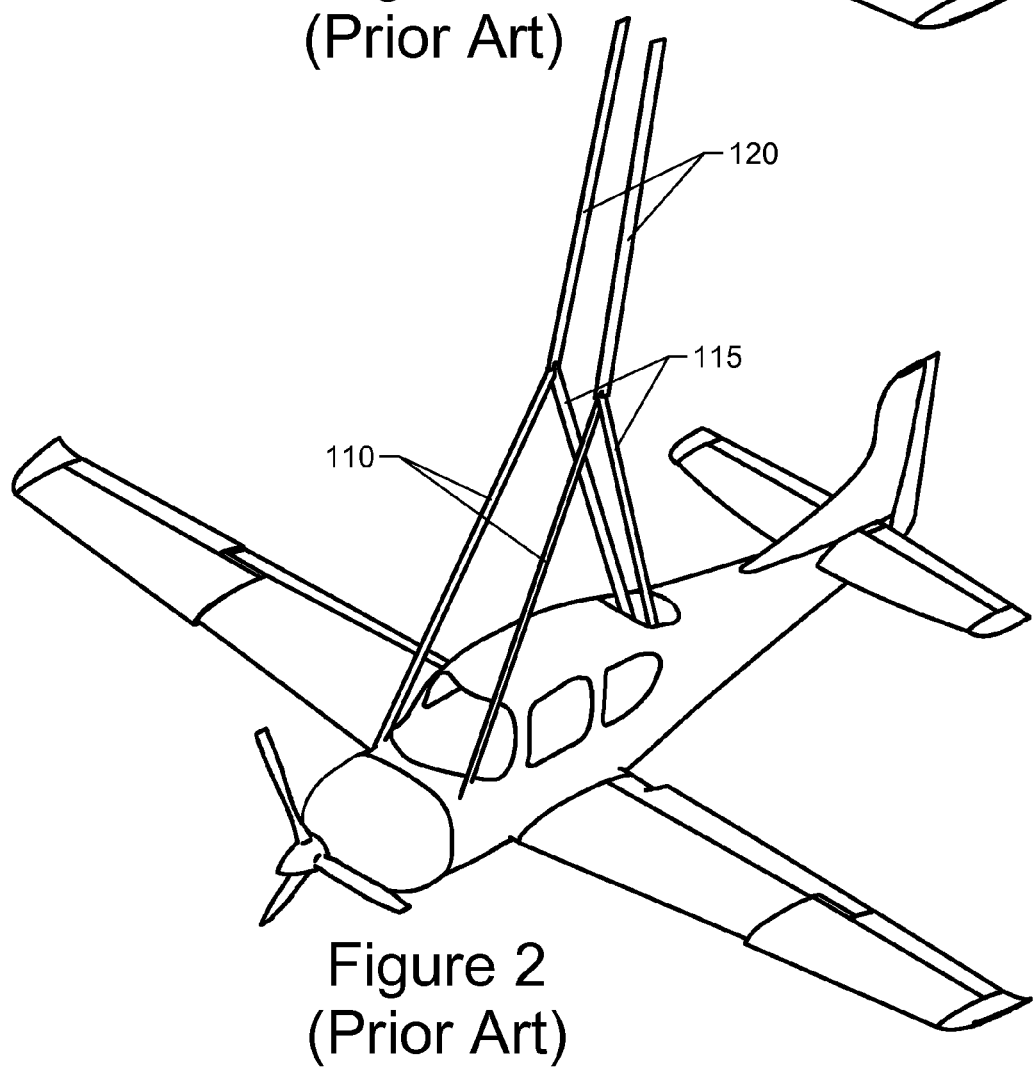
FIG. 2 is a view of a prior art aircraft with a whole-aircraft ballistic parachute system, which has been deployed.
Figure 3:
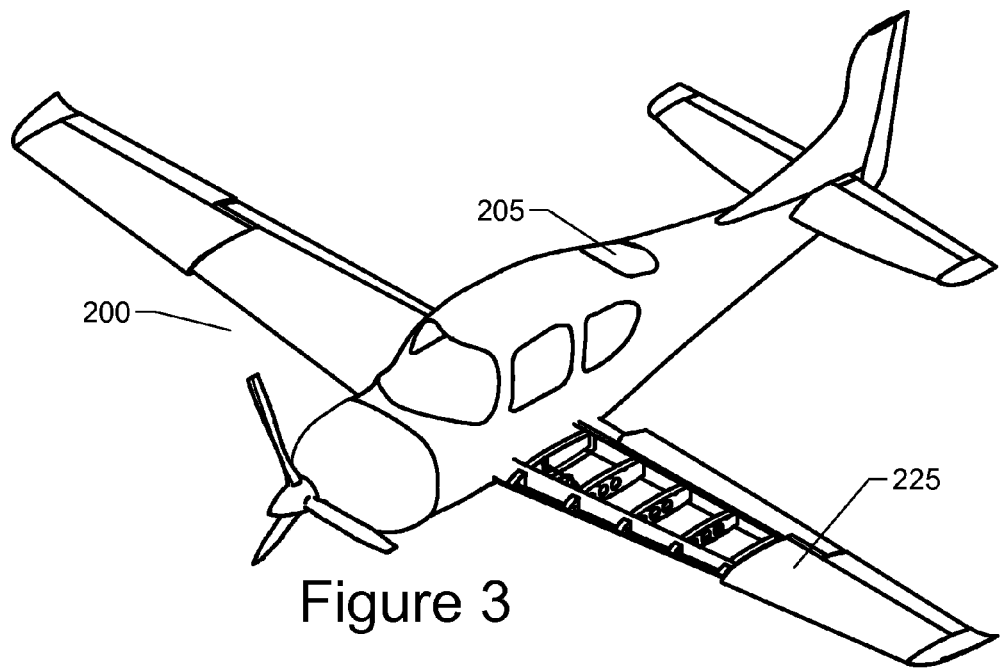
FIG. 3 is a view of one embodiment of the invention, an increased-safety aircraft, with an upper wing skin removed.
Figure 4:
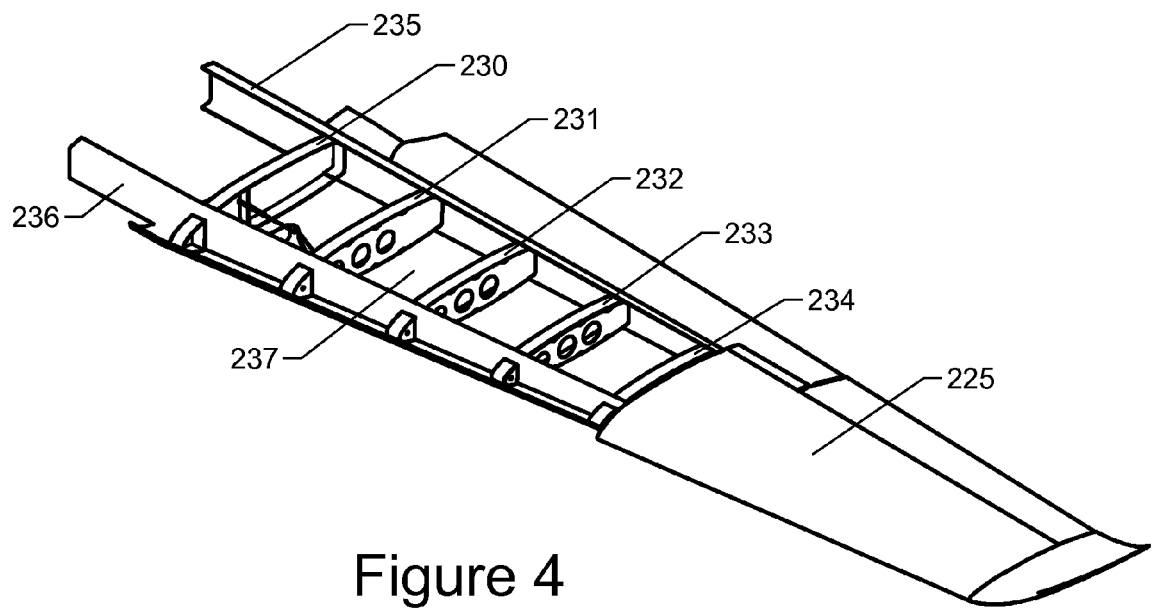
FIG. 4 is a view of the wing of FIG. 3.

FIG. 3 presents an increased-safety aircraft 200. The aircraft 200 includes a fragile whole-aircraft parachute cover 205 and a wing 225. A portion of the upper wing skin of the wing 225 has been removed so as to show various aspects of the wing 225. FIG. 4 presents a more detailed view of the wing of FIG. 3.

As can be seen in FIG. 4, the wing includes a number of ribs 230-234, a rear spar 235, a forward spar 236, and a lower wing skin 237. The inboard rib 230, the outboard rib 234, the rear spar 235, the forward spar 236, the lower wing skin 237, and the upper wing skin (not shown) form a fuel tank that stores aircraft fuel. The aircraft fuel may be 100LL aircraft fuel, jet fuel, diesel fuel, or any other aircraft fuel, such as ethanol or a high-octane automotive fuel used by some aircraft.

The intermediate ribs 231-233 contain passageways that allow a significant flow rate of aircraft fuel from outer fuel bays to the inner fuel bay, which is formed by the inner rib 230, the first intermediate rib 231, the rear spar 235, the forward spar 236, the lower wing skin 237, and the upper wing skin (not shown).

Conventional ribs contain small passageways that enable low flow rates of fuel from outer fuel bays to inner fuel bays. These conventional passageways enable the fueling of an aircraft by supplying fuel to an outer fuel bay. The fuel then slowly fills the inner fuel bay by passing through rib passageways. However, the rib passageways of FIG. 4 are significantly larger than conventional rib passageways. The passageways are sized to enable the vast majority or all of the fuel contained in the outer fuel bays to enter the inner fuel bay within a specified time. This time can be 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40 or greater seconds. The exact amount of time should be less than the amount of time between when the whole-aircraft parachute is activated, i.e., commanded to deploy, and when, under worst-case conditions, the aircraft contacts the earth. Thus, the intermediate rib passageways should allow for the aircraft fuel in the outer fuel bays to enter the inner fuel bay in less than the time between parachute activation and the time that the aircraft contacts the earth or an object connected to the earth.

The above-discussed specified time could be approximated to be:

Time=parachute deployment time+((minimum parachute deployment altitude above ground−altitude loss during parachute deployment)/maximum parachute descent rate)

Thus, if the parachute deployment time is 8 seconds, the minimum allowed parachute deployment altitude above ground (as specified in the aircraft's handbook) is 1000 feet, the altitude loss during parachute deployment is 920 feet, and the maximum parachute descent rate is 27 feet per second at a specified altitude, then the time could be equal to about (8 seconds+(1000 feet−920 feet)/27 feet per second) 11 seconds.

Figure 5:
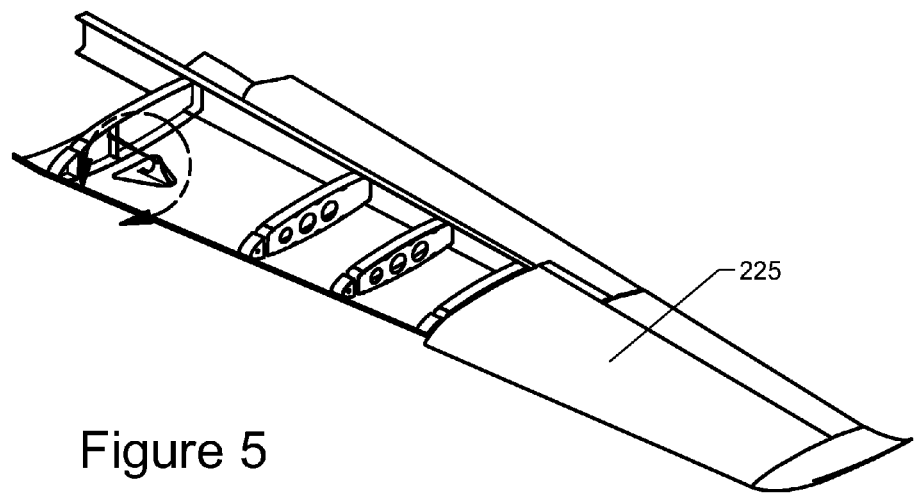
FIG. 5 is a view of the wing of FIG. 4 with the forward spar and a rib removed.
Figure 6:
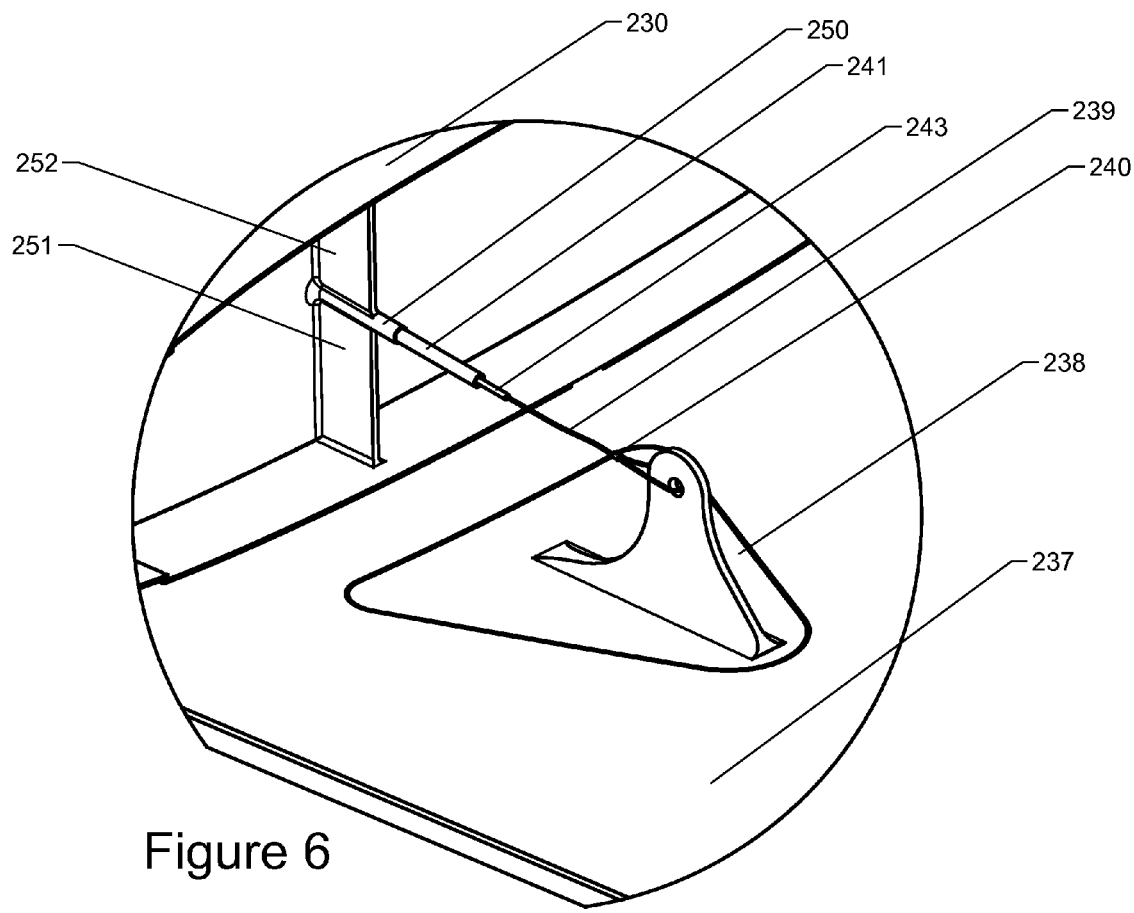
FIG. 6 is a detailed view of the wing of FIG. 5.

FIG. 5 presents the wing of FIG. 4 with the forward spar 236 and the first intermediate rib 231 removed so as to show various aspects of the wing 225. FIG. 6 presents a detailed view of a portion of the wing of FIG. 5. As can be seen in FIG. 6, a panel 238 is coupled to the lower wing skin 237.

The panel 238 shown in FIG. 6 contains a triangular base with rounded corners. The shape of the base could be a square, a rectangle, a parallelogram, a trapezoid, an octagon, or any other shape. The panel 238 shown in FIG. 6 also includes a member that is perpendicular to the base. However, the panel need not include the member shown in FIG. 6. The panel 238 could be formed from carbon fiber, fiberglass, sheet metal, and/or other structural materials.

In some embodiments of the invention, such as is shown in FIG. 6, the coupling between the lower wing skin 237 and the panel 238 is made with a breakable joint. One example of a breakable joint is a joint made from micro, i.e., epoxy that is mixed with micro-balloons. Micro-balloons are hollow bubbles that are typically microscopic in size. Micro-balloons can be obtained from www.aerocraftparts.com under the part number C-15. Another example of a breakable joint is a small surface area joint made with epoxy mixed with a structural resin filler, such as flocked cotton fiber. Flocked cotton fiber can be obtained from www.aerocraftparts.com under the part number 525. Still another breakable joint is a joint made with epoxy, micro-balloons, and a structural resin filler. In addition to or in lieu of the above discussed breakable joints, a thin low strength fiberglass cloth that is impregnated with epoxy could be used to couple the lower wing skin 237 and the panel 238. This cloth could bond the upper surfaces of the lower wing skin 237 and the panel 238. A similar low strength cloth could also bond the lower surfaces of the lower wing skin 237 and the panel 238

As shown in FIG. 6, the panel 238 is coupled to a cable 239. The cable 239 could be a 1/16" 7×7 stainless steel cable, such as the cable available from www.aircraftspruce.com under the part number 05-03500. As also shown in FIG. 6, a portion of a loop formed in the cable passes through a hole in the panel 238. The cable loop is secured by a sleeve 240, such as the nicopress sleeve available from www.aircraftspruce.com under the part number 18-1-C.

Figure 7:
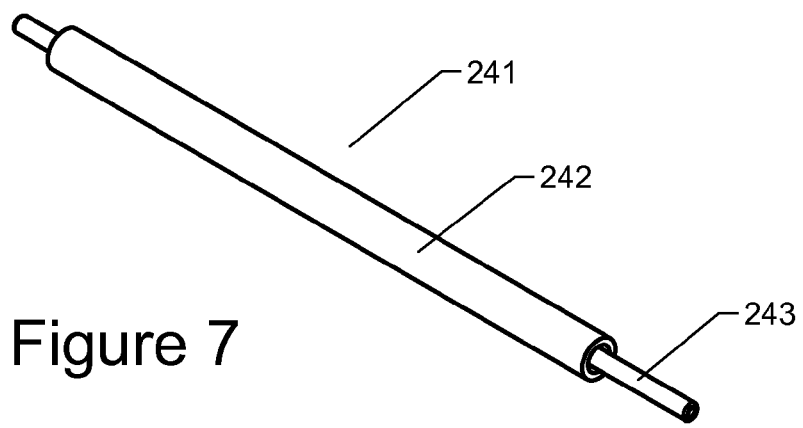
FIG. 7 is a view of a pass-through assembly of FIG. 6.

As shown in FIG. 6, the cable 239 is also coupled to a pass-through that forms a part of a pass-through assembly 241. A more detailed view of the pass-through assembly 241 is shown in FIG. 7. As shown in FIG. 7, the pass-through assembly 241 includes a tube 242 and a pass-through 243. The tube could be a 3/8" aluminum tube having an internal diameter of 0.245", which is available from www.aircraftspruce.com under the part number 03-35700.

Figure 8:
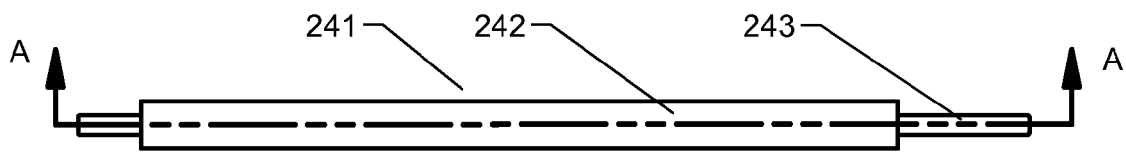
FIG. 8 is another view of the pass-through assembly of FIG. 6, showing a cross section cut out.
Figure 9:
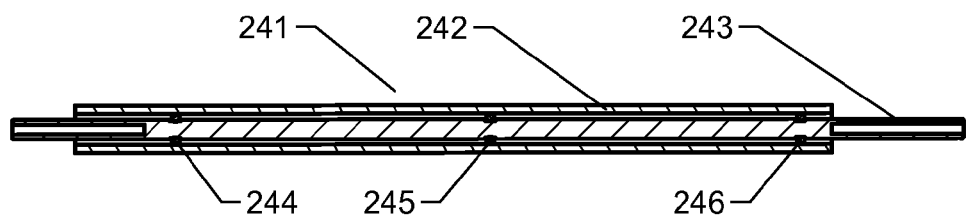
FIG. 9 is a cross-section view of the pass-through assembly of FIG. 8.

FIG. 8 presents another view of the pass-through assembly 241 that shows a cross section cutout plane A-A. FIG. 9 shows a cross section view of cutout plane A-A. FIG. 9 shows three o-rings 244-246 located between the tube 242 and the pass-through 243. O-rings 244-246 could be fuel resistant o-rings, which are available from www.aircraftspruce.com under the part number MS29513-006. In addition to the three o-rings 244-246, a small amount of a fuel resistant adhesive could be placed between the pass-through 243 and the tube 242. This adhesive could prevent pass-through 243 movement with respect to the tube 242 unless a moderate force were applied to the pass-through 243. In addition, the adhesive could provide a redundant seal for the aircraft fuel.

The axial distance between the inner o-ring 244 and the outer o-ring 246 limits the effective axial travel of the pass-through 243 with respect to the tube 242. Any travel in excess of the distance between the inner o-ring 244 and the outer o-ring 246 could allow aircraft fuel to escape the fuel tank and enter into the fuselage of the aircraft.

Figure 10:
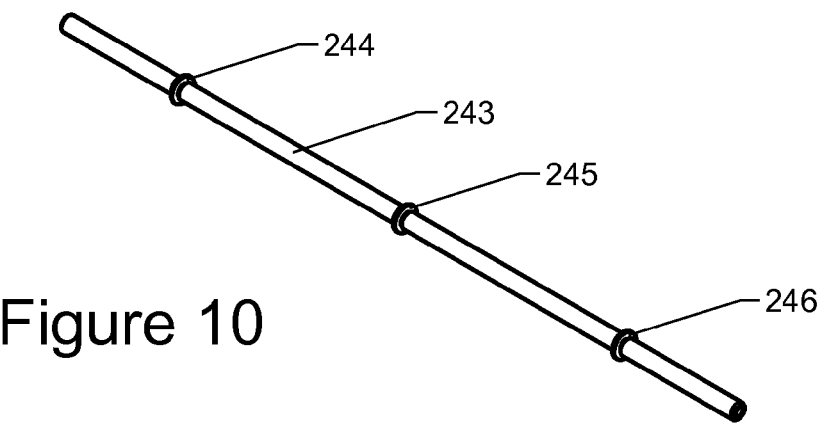
FIG. 10 is a view of a pass-through and three o-rings.

As shown in FIG. 9, each end of the pass-through 243, which may be made of stainless steel, includes a cavity. These cavities could be 1.047" deep and have a diameter of 0.078". Such cavities enable a rotary swaging tool to compress the pass-through cavities so that they firmly hold 1/16" stainless steel cables. FIG. 10 presents another view of the pass-through 243 and the three o-rings 244-246.

Figure 11:
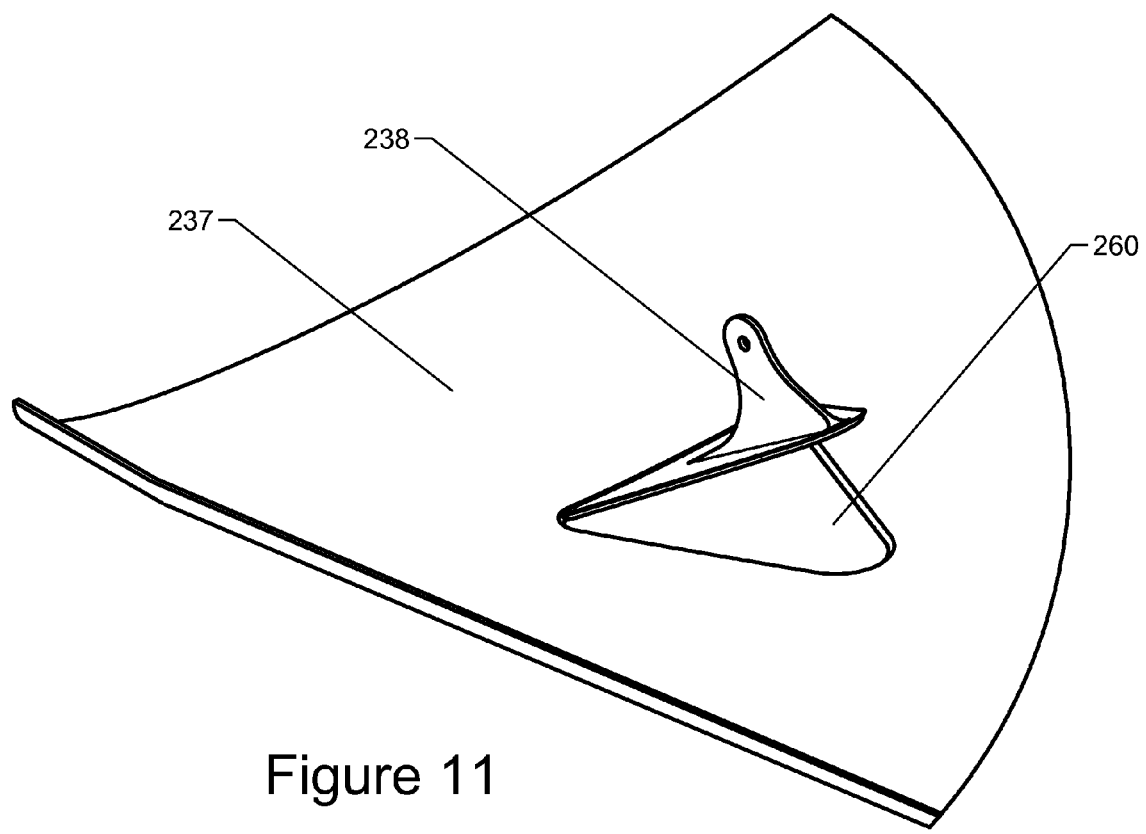
FIG. 11 is a detailed view of a lower wing skin and a rotated panel.

As shown in FIG. 6, one end of the pass-through 243 is secured to cable 239. The other end of the pass-through 243 could be coupled to either a forward parachute strap or a rear parachute strap. This coupling could be via a single cable (not shown) or via one or more of the following: cables, fasteners, push-pull tubes, bell-cranks, pulleys, and/or intermediate straps. Regardless of the components utilized, the coupling insures that when the forward parachute strap or the rear parachute strap is tensioned, the cable 239 is also tensioned. When sufficient tension is applied to cable 239, then the joint between the panel 238 and the lower wing skin 237 will be broken and then the panel 238 will move, i.e., translate and/or rotate, with respect to the lower wing skin 237. This movement will create a discharge passageway 260, as shown in FIG. 11, between the base of the panel 238 and the lower wing skin 237. The creation of the discharge passageway 260 enables the aircraft fuel to rapidly discharge through the discharge passageway 260. The discharge passageway 260 is sized to enable the vast majority or all the fuel contained in the fuel tank to discharge within a specified time. This time can be 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40 or greater seconds. The exact amount of time should be less than the amount of time between when the whole-aircraft parachute is activated and when, under worst-case conditions, the aircraft contacts the earth.

Referring again to FIG. 6, the tube 242 of the pass-through assembly 241 is coupled to the inner rib 230 at the inner diameter of the boss 250. This coupling, which could be an epoxy coupling, should not allow aircraft fuel to pass between the inner diameter of the boss 250 and the outer diameter of the tube 242 of the pass-through assembly 241. As shown in FIG. 6, the inner rib 230 includes two stiffeners 251 and 252 that vertically support the pass-through assembly 241. In addition, horizontal stiffeners (not shown) could be utilized to support the pass-through assembly 241 horizontally.

FIGS. 6-10 disclose one embodiment of a pass-through assembly. Many other embodiments of pass-through assemblies can be utilized. All that is required of the pass-through assembly is (1) that, before parachute activation, the pass-through assembly does not enable aircraft fuel to exit the fuel tank via the pass-through assembly and (2) that the pass-through assembly enable sufficient force be applied to panel 238 to create an aircraft fuel discharge passageway.

Figure 12:
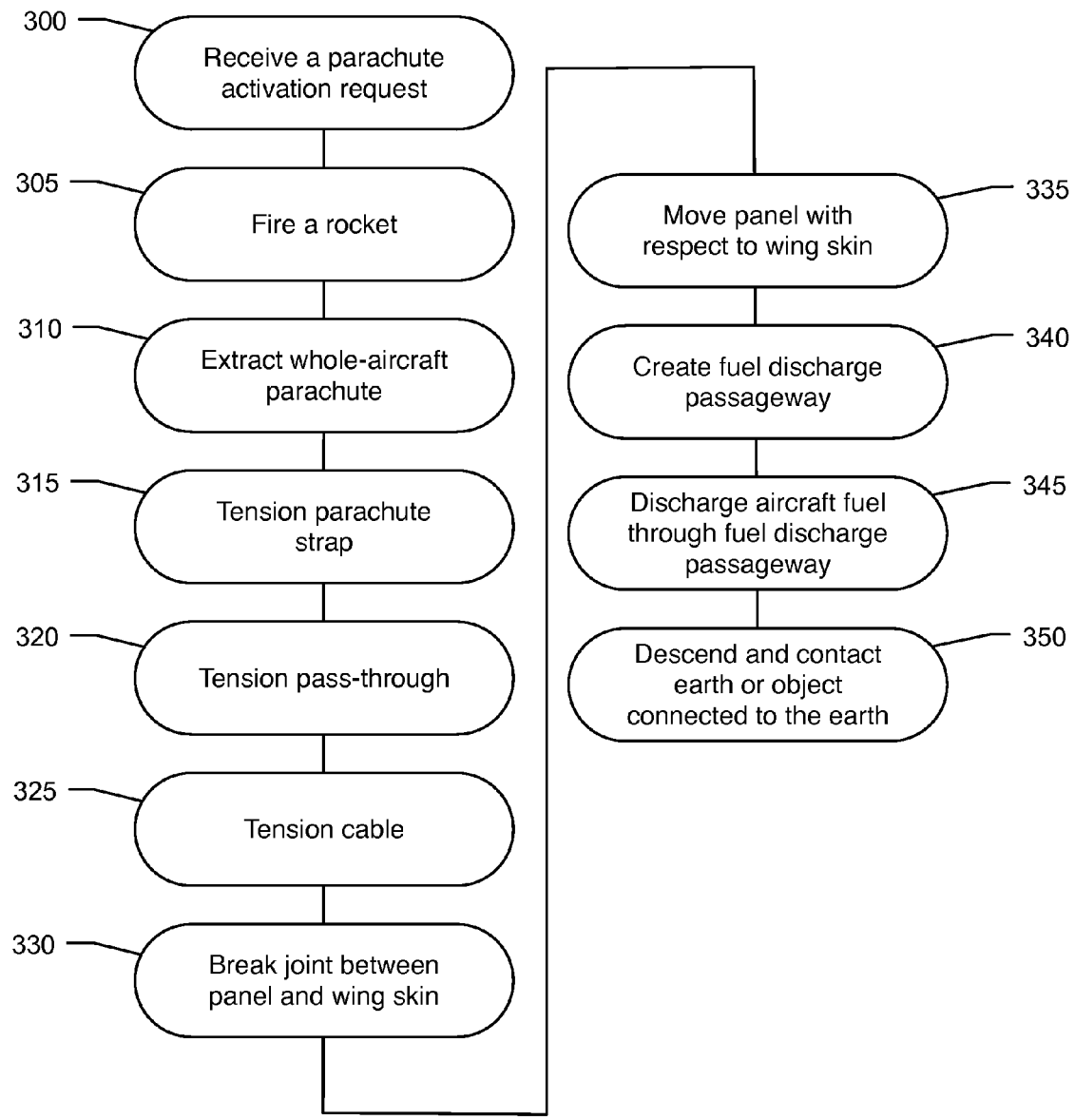
FIG. 12 is a flowchart of a method performed by an increased-safety aircraft.

One method performed by the enhanced-safety aircraft described above is the method shown in FIG. 12. First, as shown in block 300, the aircraft receives a parachute activation request. This request could result directly from an aircraft occupant pulling a parachute deployment handle. Alternatively, the request could result from a computer receiving a parachute deployment request from an aircraft occupant, performing an analysis, and then issuing a second parachute deployment request, which is received by the whole-aircraft ballistic parachute system. Then, as shown in block 305, a rocket is fired. Next, as shown in block 310, a whole-aircraft parachute is extracted. For example, the parachute could be extracted from a cavity under a fragile parachute cover. Then, as shown in block 315, a strap, such as a forward parachute strap or a rear parachute strap is tensioned. As a result of the strap tension, as shown in block 320, the pass-through 243 is tensioned. As a result of the pass-through 243 being tensioned, as shown in block 325, cable 239 is also tensioned. The tension in cable 239, as shown in block 330, causes the joint between the panel 238 and the lower wing skin 237 to break. Then, as shown in block 335, the panel 238 moves, i.e., translates and/or rotates, with respect to the lower wing skin 237. As a result of the panel's movement, as shown in block 340, a fuel discharge passageway 260 is created in the lower wing skin 237. Then, as shown in block 345, aircraft fuel discharges through the fuel discharge passageway 260. Finally, as shown in block 350, the aircraft descends and contacts the earth or an object connected to the earth, such as a tree.

One result of the above aircraft fuel discharge is that the weight of the aircraft is decreased. The weight reduction decreases the descent rate of the aircraft as the whole aircraft parachute lowers the aircraft.

The terminal velocity of a mass being lowered by a parachute is proportional to the square root of the mass. Thus, if a plane, such as a four passenger turbo-charged-piston engine plane, having an empty weight of 2225 pounds that is carrying a single 200 pound occupant and 92 gallons of fuel (weighing 664 pounds) discharges its fuel, then the descent rate of the aircraft could decrease by $[1-((2225+200)/(2225+200+552))^{0.5}]$ 10%. Similarly, if a plane, such as four passenger jet engine plane, having an empty weight of 3700 pounds that is carrying a single 200 pound occupant and 288 gallons of jet fuel (weighing 1960 pounds) discharges its fuel, then the descent rate of the aircraft could decrease by $[1-((3700+200)/(3700+200+1960))^{0.5}]$ 18%. These reductions in descent rate could significantly reduce injuries to aircraft occupants and could significantly reduce damage to the aircraft when the aircraft contacts the earth or an object connected to the earth.

In addition to reducing the descent rate of the aircraft, another significant advantage of the above systems and methods is that the aircraft fuel, which is flammable and dangerous, is separated from the aircraft and, more importantly, the aircraft occupants. By discharging the aircraft fuel when the aircraft is still airborne, the opportunity for an aircraft fuel discharge, such as because of a wing puncture during impact with the earth or an object connected to the earth, is eliminated. This risk elimination greatly increases the safety of the aircraft.

The above-described system could be very simply integrated into an aircraft. The weight penalty for such a system can be less than one pound per aircraft fuel tank. Thus, if an aircraft has a fuel tank in its left and right wings, then the total increase in weight could be less than two pounds.

While the above-described system includes only a single panel in the inner fuel bay of each wing, other embodiments could include a panel in one or more outer fuel bays. Such a system could be heavier than the above-described system. However, such a system could more rapidly discharge aircraft fuel. Still other embodiments could include a panel on the upper wing skin in the inner fuel bay (and/or outer fuel bays). This upper panel, when moved with respect to the upper wing skin, could create an air intake passageway that could provide a vent for air to enter the fuel bay when aircraft fuel is discharging. Such a vent could increase the discharge rate of fuel through a fuel discharge passageway in a lower wing skin.

The above-discussed panels could be coupled to a single pass-through via cables to minimize the weight of the system. Alternatively, multiple pass-throughs could be utilized.

The methods and systems described above could also be utilized to discharge other liquids from an aircraft. For example, the methods and systems could be utilized to discharge anti-icing liquids, such as glycol, which may be stored in wings or in the fuselage of an aircraft.

Aircraft occupant safety could be still further increased by interfacing a whole aircraft ballistic parachute, with or without a fuel/anti-icing fluid discharge system, to a computer system. One such system is shown in FIG. 13.

Figure 13:
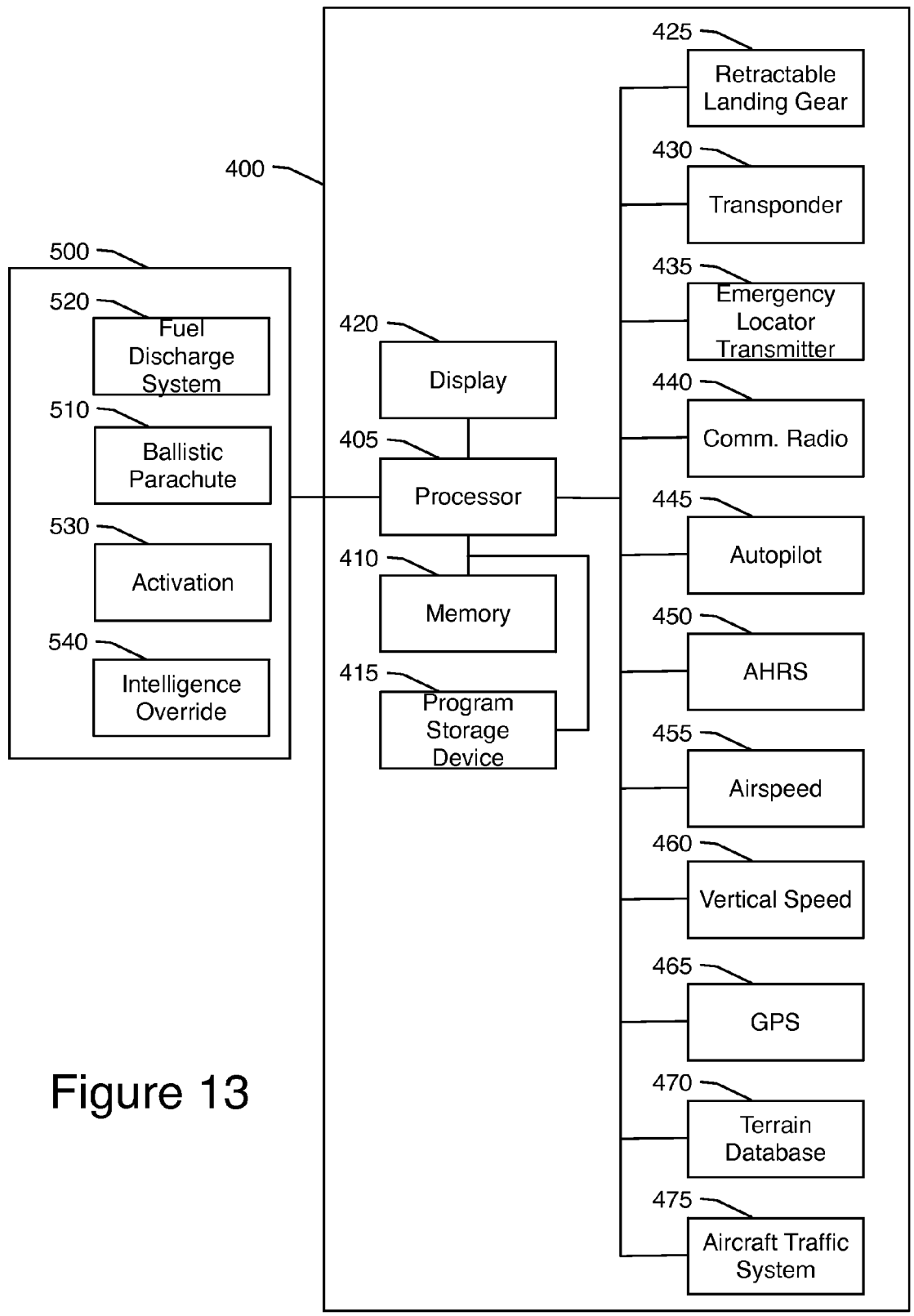
FIG. 13 is a diagram of a system for increasing the safety of aircraft occupants.

Referring to FIG. 13, the computer system 400 includes a processor 405 that is coupled to memory 410, a program storage device 415, and a display 420. The processor 405 could be an x86 instruction set compatible processor, an ARM instruction set compatible processor, or any other processor. Memory 410 could be conventional memory such as DRAM or SRAM. Program storage device 415 could be any non-volatile memory, such as FLASH memory, or a hard disk drive. Display 420 could be an LCD display, a CRT, or any conventional display.

As shown in FIG. 13, processor 405 is coupled to a number of aircraft devices 425-475. Typically, the processor could be connected to these aircraft devices 425-475 by communication interfaces (not shown). Such communication interfaces could include discrete electrical signal interfaces, serial interfaces, such as RS-232 interfaces, USB™ interfaces, FIREWIRE™ interfaces, Ethernet interfaces, I²C interfaces, or parallel interfaces. These communication interfaces are well known by those of skill in the art.

As shown in FIG. 13, the processor 405 is coupled to the retractable landing gear 425 of the aircraft. Thus, the processor could receive, typically through one or more discrete signals, data that indicates whether the retractable landing gear 425 of the aircraft is extended or refracted. In addition, the processor 405 could output data, such as a discrete signal, that causes the retractable landing gear to extend or retract.

As also shown in FIG. 13, the processor 405 is coupled to the aircraft transponder 430. Such a coupling could typically be via an RS-232 interface. The processor 405 could receive data that indicates the transponder code, which is known as the squawk code, being transmitted by the transponder. In addition, the processor could receive data that indicates whether the transponder 430 is actively transmitting responses to received radio-frequency interrogations, or whether the transponder is off or is in a standby mode. The processor 405 could also command the transponder 430 to change its transponder code to a specified code, such as the 7700 general emergency code. In addition, the processor 405 could command the transponder 430 to enter a specified mode such as Mode A, Mode C, or Mode S.

Again as shown in FIG. 13, the processor 405 is coupled to an emergency locator transmitter 435, which is also known by those of skill in the art as an ELT. This coupling could be via a discrete signal interface. Thus, the processor 405 could receive data that indicates whether the emergency locator transmitter 435 is transmitting a signal, such as a 406 MHz distress/locator signal. In addition, the processor 405 could command the emergency locator transmitter 435 to transmit a signal, such as a 406 MHz distress/locator signal, if the emergency locator transmitter 435 is not already transmitting a signal.

As shown in FIG. 13, the processor 405 is coupled to a communication radio 440. This coupling could typically be via a RS-232 interface and an audio interface. Thus, the processor 405 could receive data that indicates the frequency that the communication radio 400 is set to receive and/or transmit. In addition, the processor 405 could command the communication radio to set the receive frequency and/or transmit frequency to a specified frequency, such as the 121.5 MHz emergency frequency. Further, the processor could command the communication radio 440 to transmit a particular message on a frequency, such as the 121.5 MHz frequency. Such a message could include the aircraft type, the aircraft N number, the aircraft colors, the aircraft latitude and longitude coordinates, the aircraft altitude, the fact that a whole-aircraft parachute has been deployed, the cellular phone number of the pilot, and/or the emergency contact phone number of the pilot. In addition, the message could indicate the possible cause of the emergency, such as an aircraft/aircraft collision or an excessive acceleration as can be experienced in thunderstorms.

Again, as shown in FIG. 13, the processor is coupled to the autopilot 445. This coupling could typically be via an RS-232 interface. Thus, the processor 405 could determine the operational status of the autopilot. For example, the processor 405 could determine if the autopilot 445 is functioning properly, is engaged, and/or is operating in a particular mode, such as climb, descend, maintain altitude, maintain speed during climb, GPS track, etc. In addition, the processor 405 could command the autopilot 445 to change its operational status. Thus, the processor 405 could command the autopilot 445 to engage. Similarly, the processor 405 could command the autopilot to climb, maintain altitude, turn and/or level wings.

As shown in FIG. 13, the processor 405 is also coupled to an attitude-heading-reference-system ("AHRS") 450. This coupling is typically via an RS-232 interface. Thus, the processor could receive data that indicates the attitude of the aircraft (roll, pitch, heading) as well as the rate of change of attitude with respect to time (roll rate, pitch rate, heading rate). The AHRS 450 could also provide the processor 405 with X, Y, and Z acceleration levels. By analyzing the data received from the AHRS 450, the processor 405 could determine if an aircraft/aircraft collision has occurred. For example, if a high frequency acceleration is detected from a FFT analysis of the X, Y, and/or Z accelerations, followed by a rapid change in aircraft attitude, then it is likely that an aircraft/aircraft collision has occurred.

Again, as shown in FIG. 13, the processor 405 is coupled to an aircraft's airspeed sensor 455 and a vertical speed sensor 460. Thus, the processor 405 can receive data that indicates the aircraft's speed through the air and whether the aircraft is climbing or descending.

As shown in FIG. 13, the processor 405 is also coupled to a GPS 465. This coupling could typically be via an RS-232 interface. Thus, the processor 405 can receive data that indicates the latitude and longitude coordinates, as well as the altitude of the aircraft. In addition, as the GPS 465 may include a terrain database, the processor 405 may also receive data that indicates whether a collision with the earth or an object connected to the earth, such as a tower, is eminent.

As shown in FIG. 13, the processor 405 may also be coupled to another terrain database 470. The terrain database 470 could provide the processor 405 with detailed ground elevation for various latitude and longitude coordinates. With the use of the terrain database 470 and data from the GPS 465, the processor 405 could determine the aircraft's current altitude above ground as well as the aircraft's future altitude above the ground if the aircraft continues on it present track.

As shown in FIG. 13, the processor 405 is also coupled to an aircraft traffic system 475. This coupling could typically be via an RS-232 interface. Thus, the processor 405 could receive data that indicates the relative distance and relative altitude of other nearby aircraft. This data could be utilized, in conjunction with data received from the AHRS 450, to determine if an aircraft/aircraft collision has occurred.

As shown in FIG. 13, the processor 405 is coupled to a whole aircraft ballistic parachute system 500. This coupling could be via a discrete signal interface, by an RS-232 interface, by an I$^2$C interface, or by any other electrical interface. In an effort to reduce the complexity and cost of the ballistic parachute system 500, the discrete signal interface may be optimal.

The ballistic parachute system 500 shown in FIG. 13 includes a whole-aircraft ballistic parachute 510, a fuel discharge system 520, an activation interface 530, and an intelligence override interface 540. The ballistic parachute 510 is of sufficient size and strength to lower an entire aircraft to the earth. The fuel discharge system could create a fuel discharge passageway, as discussed above, when a parachute strap tensions. The ballistic parachute system's activation interface 530 could be a conventional pull-handle that activates the deployment of the ballistic parachute 510. In addition, the activation interface 530 could generate data that is sent to the processor 405 so that the processor can perform an analysis, as discussed below, to determine if any actions need to be performed before the activation of the deployment of the ballistic parachute 510. The ballistic parachute system's intelligence override interface 540 immediately activates the deployment of the ballistic parachute 510 regardless of whether the processor 405 determines that one or more actions need to be performed before the activation of the deployment of the ballistic parachute 510. This intelligence override interface 540 could be a second pull of the above-discussed pull-handle, a separate pull-handle, or a button placed near the above-discussed pull-handle.

In some ballistic parachute systems, the coupling between the ballistic parachute system 500 and the processor 405 only provides the processor 405 with data that indicates that the ballistic parachute 510 has been deployed. This coupling could be via a discrete signal interface. For example, the ballistic parachute system 500 could contain a very thin wire that breaks when the ballistic parachute 510 is deployed. This wire could be coupled to electrical ground by a pull-down resistor. By applying a voltage to that wire and measuring the return voltage, the processor could determine if the ballistic parachute 510 has been deployed.

In other ballistic parachute systems, the coupling could also provide the processor 405 with data that indicates that an activation request has been received from the activation interface 530. In such ballistic parachute systems, the coupling could typically also communicate an activation command from the processor 405 that could activate the deployment of the ballistic parachute 510.

Figure 14:
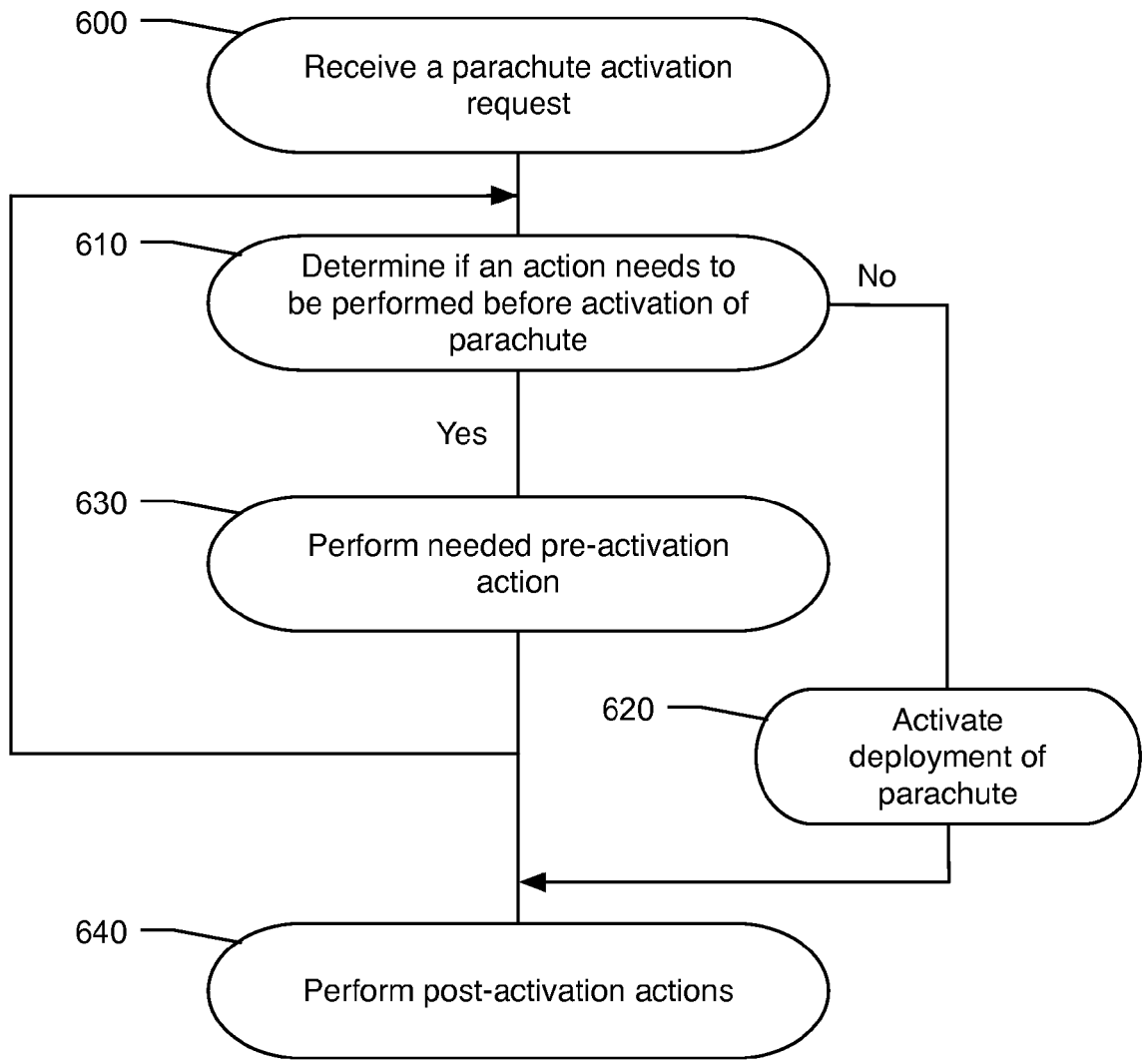
FIG. 14 is a flowchart of a method performed by the system of FIG. 13.

One method of operating the system shown in FIG. 13 is presented in FIG. 14. First, as shown in block 600, the processor 405 could receive a parachute activation request from the ballistic parachute system's activation interface 530. Then, the processor 405 could determine if an action needs to be performed before the activation of the ballistic parachute 510.

One such determination could be to determine if the altitude of the aircraft above the ground needs to be increased for a safe deployment of the ballistic parachute 510. To perform such a determination, the processor 405 could receive longitude and latitude coordinates as well as aircraft altitude from the GPS 465. Then, the processor 405 could query terrain database 470 with the longitude and latitude coordinates to determine the ground elevation at those coordinates. Then, processor 405 could calculate the aircraft's altitude above the ground. If this calculated altitude is less than the minimum safe parachute deployment altitude, then the altitude of the aircraft needs to be increased for a safe deployment of the ballistic parachute 510.

Another determination could be to determine if the airspeed of the aircraft needs to be decreased for a safe deployment of the ballistic parachute 510. To perform such a determination, the processor 405 could receive airspeed data from airspeed sensor 455. Then, the processor 405 could then compare the received airspeed with the maximum safe parachute deployment airspeed. If the received airspeed is greater than the maximum safe parachute deployment airspeed, then the airspeed of the aircraft needs to be decreased for a safe deployment of the ballistic parachute 510.

Another determination could be to determine if the heading of the aircraft will result in an impact into terrain if the ballistic parachute 510 is deployed. To perform such a determination, the processor 405 could receive track data from the GPS 465 and/or could receive heading data from the AHRS 450. Then, using the previously discussed latitude and longitude data together with the previously discussed aircraft altitude data, the processor 405 could query the terrain database 470 to determine if the aircraft will impact terrain during a parachute deployment. If an impact into terrain is determined to be likely, then the heading of the aircraft needs to be changed for a safe deployment of the ballistic parachute 510.

Yet another determination could be to determine if the attitude of the aircraft is proper for a deployment of the ballistic parachute 510. To perform such a determination, the processor 405 could receive attitude data (pitch, roll, heading), and possibly rate of change of attitude, from the AHRS 450. If the received data indicates that the attitude is incorrect, for example, if the aircraft is inverted, then the aircraft attitude needs to be corrected for a safe deployment of the ballistic parachute 510.

Still other determinations could be combinations of the above determinations. For example, it may be allowable to deploy the ballistic parachute 510 when the aircraft is inverted, but only if the aircraft's altitude above ground is equal to or greater than twice the minimum safe parachute deployment altitude. Thus, combinations of the above may be determined by the processor 405.

Referring again to FIG. 14, if the processor 405 at block 610 determines that no action needs to be performed before activation of the ballistic parachute 510, then, as shown in block 620, the processor 405 issues a command to the ballistic parachute system 500 to activate deployment of the ballistic parachute 510.

The above-discussed action-determinations can be pre-calculated by the processor 405 before the activation request is received by the processor 405. Thus, the delay required to check if an action needs to be performed can be less than $\frac{1}{100}^{th}$ of a second. Thus, the ballistic parachute deployment could not be delayed by an amount that could impact the safety of the aircraft occupants.

Referring again to FIG. 14, if the processor 405 at block 610 determines that an above-discussed action, i.e., a pre-activation action, is needed to be performed before activation of the ballistic parachute 510, then as shown in block 630, the processor 405 initiates such pre-activation action.

For example, if the aircraft altitude needs to be increased, then the processor 405 could attempt to increase the aircraft's altitude above the ground. Specifically, if the autopilot 445 is not engaged, then the processor 405 could engage the autopilot 445 and instruct the autopilot 445 to initiate a steep climb to rapidly increase the altitude of the aircraft. If the processor 405 has the ability to control the aircraft engine, then the processor 405 could also instruct the engine to provide full power for a maximum rate climb.

Similarly, if the airspeed of the aircraft exceeds the maximum parachute deployment airspeed, then the processor 405 could instruct the autopilot 445 to initiate a steep climb to rapidly decrease the airspeed of the aircraft. Further, the processor 405 could instruct the autopilot to cross control the aircraft ailerons and rudder to rapidly decrease the aircraft's airspeed. For example, the autopilot may be instructed to apply left rudder and right aileron, or right rudder and left aileron. In addition, the processor 405 may issue a command to lower the aircraft's landing gear 425 in order to decrease the airspeed of the aircraft. Again, if the processor 405 has the ability to control the aircraft engine, then the processor 405 could instruct the engine to reduce engine power.

Likewise, if the aircraft may impact terrain, such as rising terrain, during parachute deployment unless the aircraft track is modified, then the processor 405 could instruct the autopilot 445 to turn and possibly to climb.

Further, if the aircraft's attitude is found to be improper for a parachute deployment, then the processor 405 could instruct the autopilot to fly a straight and level attitude.

As shown in FIG. 14, the processor 405 could continue to determine if pre-activation actions need to be performed and if such actions are determined to be needed, then the processor 405 could instruct that such pre-activation actions be performed. When no pre-activation actions need to be performed, then, as shown in block 620, the processor 405 could activate deployment of the ballistic parachute 510.

As shown in FIG. 14 in block 640, after activation of the ballistic parachute 510, processor 405 could perform one or more post-activation actions. One such post-activation action could be to lower the aircraft's landing gear 425. Specifically, processor 425 could issue a command, such as setting a discrete voltage level, that lowers the aircraft's landing gear 425. By lowering the aircraft's landing gear 425, the chance of injury to aircraft occupants and the damage to the aircraft could be minimized.

Another post activation action performed by the processor 405 could be to set the transponder mode to Mode A, Mode C or Mode S and set the transponder code that is transmitted by the transponder 430 to 7700, the general emergency transponder code. By setting the transponder mode and the transmitter transponder code to 7700 as soon as possible, the opportunity for receipt of the transponder code by air traffic control is enhanced. For example, if the aircraft descends, after parachute deployment, between two mountains, then the receipt of the transponder code transmitted by transponder 430 by air traffic control may be difficult.

Yet another post-activation action performed by the processor 405 could be to activate the emergency locator transmitter 435. Again, by activating the emergency locator transmitter 435 as soon as possible, the opportunity for receipt of the signals transmitted by the emergency locator transmitter 435 is enhanced.

Still another post-activation action performed by the processor 405 could be to set the transmit frequency of the communication radio 440 to 121.5 MHz, the emergency frequency. The processor 405 could also repeatedly transmit a message at a predetermined time interval that includes the aircraft type, the aircraft N number, the aircraft colors, the aircraft latitude and longitude coordinates, the aircraft altitude, the fact that a whole-aircraft parachute has been deployed, the cellular phone number of the pilot, and/or the emergency contact phone number of the pilot. In addition, the message could indicate the possible cause of the emergency, such as an aircraft/aircraft collision, if known. The possible cause of the emergency could be determined by data received from the AHRS 450 and/or the aircraft traffic system 475, as well as from an XM aircraft weather receiver (indicating the presence of thunderstorms), and the aircraft airspeed sensor 455 (indicating over-speeding the aircraft).

Another post-activation action could be to display on the display 420 instructions for the aircraft occupants. For example, the instructions could instruct the aircraft occupants to perform or verify the performance of the above-discussed post-activation actions. The instructions could also display a post-activation checklist. This list could instruct the aircraft occupants to perform additional actions, such as to tighten seat and shoulder belts, to secure any loose items in the aircraft, to partially open aircraft doors, to lower the aircraft flaps, to turn off the aircraft engine, to turn off the fuel to the engine, to retrieve survival gear, such as life-preservers or a survival kit, and finally to turn off the aircraft's electrical system.

The above-discussed post-activation actions could also be performed before activation. For example, the above-discussed post-activation actions could be performed after the processor 405 receives a request to activate the ballistic parachute 510 but before the processor 405 issues a command to activate the ballistic parachute 510. In addition, the above-discussed post-activation actions could be performed 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 seconds before activation. However, it is believed that performance of the above-discussed post-activation actions after the activation of the ballistic parachute 510 is optimal. Thus, such actions will be referred to as post-activation actions.

Figure 15:
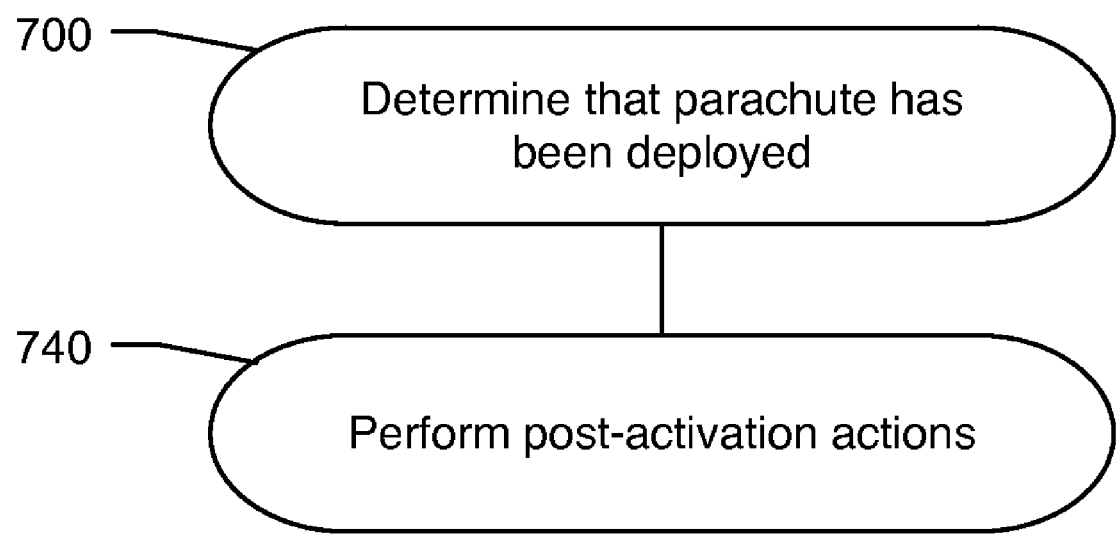
FIG. 15 is a flowchart of another method performed by the system of FIG. 13.

Yet another method that could be performed by the system of FIG. 13 is shown in FIG. 15. As shown in block 700, the processor 405 could determine that the ballistic parachute 510 has been deployed. As discussed above, this determination could be made by determining that a thin wire has been broken during the deployment of the ballistic parachute 510. After making the determination, then the processor 405, as shown in block 740, could perform one or more of the above-discussed post-activation actions. In some embodiments of the method of FIG. 15, the processor 405 may command display 420 to display a message seeking confirmation of the ballistic parachute deployment. In such embodiments, the processor 405 would not perform any post-activations actions (except for displaying the above message), until receiving confirmation of the ballistic parachute deployment from an occupant of the aircraft. Such confirmation could be indicated by an aircraft occupant depressing a button on the dash of the aircraft.

Figure 16:
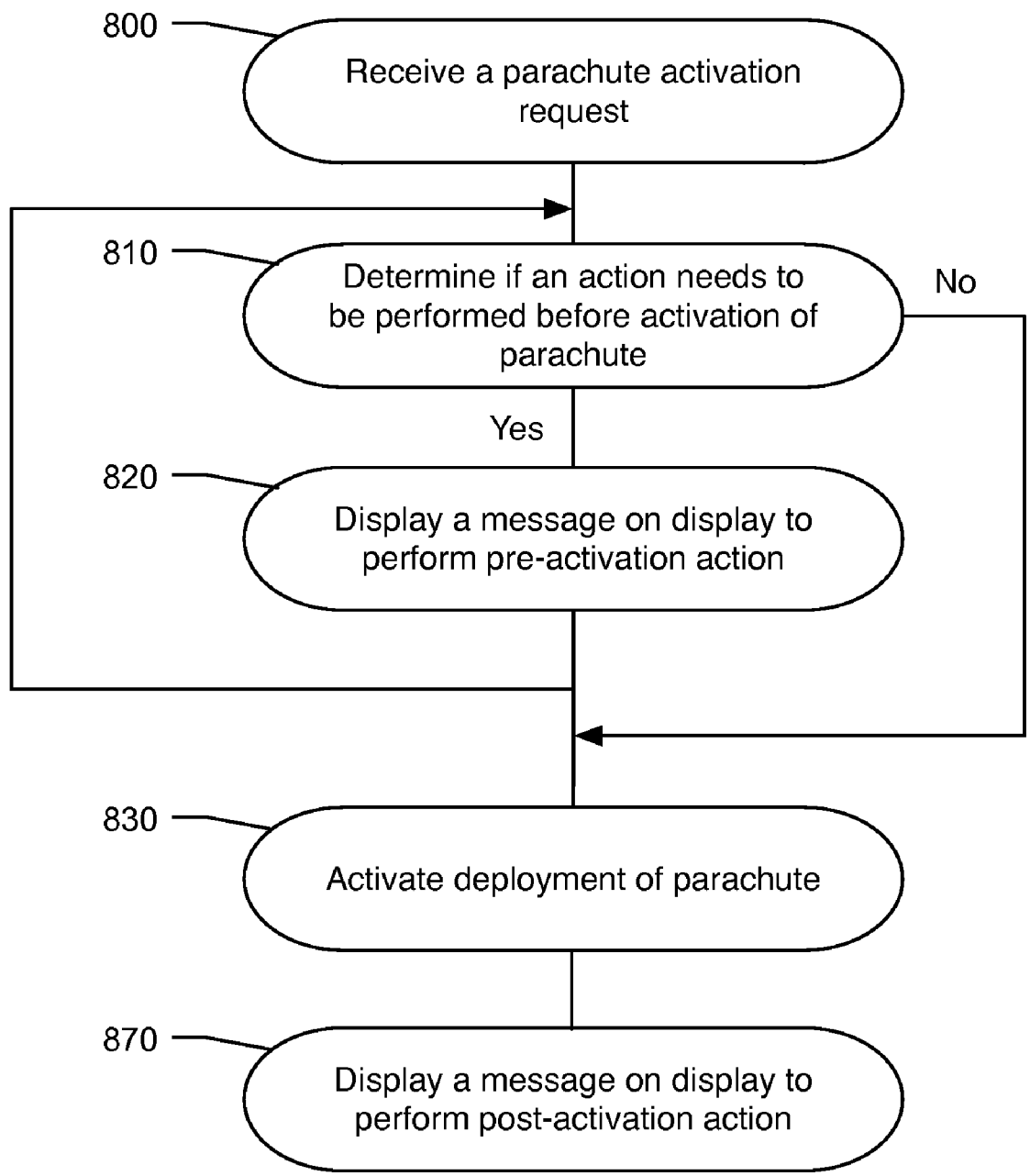
FIG. 16 is a flowchart of yet another method performed by the system of FIG. 13.

Still another method that could be performed by the system of FIG. 13 is shown in FIG. 16. As shown in block 800, the processor 405 receives a parachute activation request. Then, as shown in block 810, the processor 405 determines if a pre-activation action, such as the pre-activation actions discussed with respect to FIG. 14, needs to be performed. If no such action needs to be performed, then as shown in block 830, the processor could activate deployment of the ballistic parachute 510. If such an action does need to be performed, then, as shown in block 820, the processor 405 commands the display 420 to display a message instructing an aircraft occupant to perform one or more pre-activation actions. For example, the processor 405 may instruct the occupant to initiate a rapid climb to increase the altitude and/or decrease the airspeed of the aircraft. After a predetermined period of time, the processor could again determine if a pre-activation action needs to be performed. When no pre-activation actions need to be performed, if the processor 405 has determined that the needed actions are not being performed (because the aircraft is not climbing, slowing down, etc.) by an aircraft occupant, if a predetermined time period has expired, or if ground impact is determined to be likely, then the processor 405 could activate deployment of the ballistic parachute 510 as shown in block 830.

After activation of the deployment of ballistic parachute 510, then the processor 405 could command the display 420 to display instructions. For example, as discussed above, the displayed instructions could be to perform or verify performance of the above-discussed post-activation actions. The instructions could also display a post parachute activation checklist. This list could instruct the aircraft occupants to perform additional actions, such as to tighten seat and shoulder belts, to secure any loose items in the aircraft, to partially open aircraft doors, to lower the aircraft flaps, to turn off the aircraft engine, to turn off the fuel to the engine, to retrieve survival gear, such as life-preservers or a survival kit, and finally to turn off the aircraft's electrical system.

Some of above described systems couple a panel, such as the panel 238, to a whole-aircraft parachute strap so that when the parachute strap is tensioned, the panel 238 moves with respect to a lower wing skin, such as the lower wing skin 237. As a result of such movement, a fuel discharge passageway is created that allows aircraft fuel to rapidly discharge from an aircraft fuel tank. Other embodiments of the invention do not couple such a panel to a parachute strap. Some of these embodiments couple such a panel to an actuator, such as a screw drive linear actuator. The actuator is electrically coupled to a processor, such as the processor 405. In such embodiments, the processor can issue a command to the actuator that will cause the actuator to move. Such actuator movement will cause the panel to move with respect to the lower wing skin. Such panel movement will create a fuel discharge passageway that allows aircraft fuel to rapidly discharge from the aircraft fuel tank to which the panel forms a part. The actuator can be mounted internal to or external to the fuel tank. If the actuator is mounted external to the fuel tank, then the actuator could be coupled to the panel via one or more cables, straps, tubes, bell-cranks, etc. and a pass-through. In such embodiments, the discharging of aircraft fuel (or anti-icing fluid) would be a post-activation action, as that phrase is utilized above.

Portions of the above-described methods could be performed by a processor, such as processor 405, that is executing a computer program. This computer program can be stored in program storage device 415 and/or memory 410. The computer program would contain machine-readable instructions, that when read and executed by the processor, would perform the portions of the above-described methods.

The above description includes words such as "first", "then", and "next". These words indicate a sequence of acts. Many of the sequences can be modified within the scope of the invention. Thus, unless the result of a first act is required for a second act, the language in the above description indicating a sequence should not be considered to be limitations of the invention.

Many of the above-discussed systems and methods can be combined to produce an increased-safety aircraft. Such combinations are intended to be within the scope of the invention.

The invention claimed is:

1. A method performed by an aircraft, the aircraft including a wing, aircraft fuel, and a whole-aircraft parachute that is coupled to the aircraft, the method comprising:
    receiving a single request from an aircraft occupant;
    based upon the receipt of the single request, both deploying the whole-aircraft parachute while the aircraft is in flight and also discharging at least a portion of the aircraft fuel from the wing of the aircraft.

2. The method of claim 1, wherein the aircraft includes retractable landing gear, and the method further includes, based upon the receipt of the single request, also extending the landing gear.

3. The method of claim 1, wherein the discharging at least a portion of the aircraft fuel includes:
    creating a fuel discharge passageway for discharging the at least a portion of the aircraft fuel from the wing of the aircraft.

4. The method of claim 1, wherein the aircraft includes a lower wing skin and a panel coupled to the lower wing skin, and wherein the discharging the at least a portion of the aircraft fuel from the wing of the aircraft includes creating a fuel discharge passageway between the lower wing skin and the panel.

5. A method performed by an aircraft, the aircraft including a wing, aircraft fuel, and a whole-aircraft parachute that is coupled to the aircraft, the method comprising:
deploying the whole-aircraft parachute while the aircraft is in flight; and after deploying the parachute, but before the aircraft contacts the earth or any object coupled to the earth, discharging at least a portion of the aircraft fuel from the wing of the aircraft;
wherein the aircraft includes a lower wing skin and a panel coupled to the lower wing skin and wherein the method further includes:
during the deployment of the whole-aircraft parachute, tensioning a strap that couples the aircraft to the parachute, and tensioning a cable, which is coupled to the strap and the panel.

6. A method performed by an aircraft, the aircraft including a wing, aircraft fuel, and a whole-aircraft parachute that is coupled to the aircraft, the method comprising:
deploying the whole-aircraft parachute while the aircraft is in flight; and after deploying the parachute, but before the aircraft contacts the earth or any object coupled to the earth, discharging at least a portion of the aircraft fuel from the wing of the aircraft;
wherein the aircraft includes a lower wing skin and a panel coupled to the lower wing skin and wherein the method further includes:
during the deployment of the whole-aircraft parachute, tensioning a strap that couples the aircraft to the parachute and tensioning a cable, which is coupled to the strap and the panel; and
then creating a fuel discharge passageway for discharging the at least a portion of the aircraft fuel from the wing of the aircraft.

7. The method of claim 1, wherein the aircraft includes a lower wing skin and a panel coupled to the lower wing skin and wherein the method further includes:
during the deployment of the whole-aircraft parachute, rotating the panel with respect to at least a portion of the lower wing skin.

8. The method of claim 1, wherein the aircraft includes a lower wing skin and a panel coupled to the lower wing skin and wherein the method further includes:
during the deployment of the whole-aircraft parachute, translating the panel with respect to at least a portion of the lower wing skin.

9. A method performed by an aircraft, the aircraft including a wing, aircraft fuel, and a whole-aircraft parachute that is coupled to the aircraft, the method comprising:
deploying the whole-aircraft parachute while the aircraft is in flight; and after deploying the parachute, but before the aircraft contacts the earth or any object coupled to the earth, discharging at least a portion of the aircraft fuel from the wing of the aircraft;
wherein the aircraft includes a lower wing skin and a panel coupled to the lower wing skin by a joint that includes epoxy and wherein the method further includes:
during the deployment of the whole-aircraft parachute, breaking at least a portion of the epoxy joint between the panel and the lower wing skin.

10. The method of claim 1, wherein the aircraft includes anti-icing fluid and wherein the method further includes;
based upon the receipt of the single request, also discharging at least a portion of the anti-icing fluid from the aircraft.

11. An aircraft including:
a whole-aircraft parachute;
a harness containing a plurality of straps that couple the whole-aircraft parachute to a plurality of locations on the aircraft;
aircraft fuel; and
a fuel discharge system;
wherein the aircraft is operative to receive a single request from an occupant of the aircraft, and both deploy the whole-aircraft parachute and also discharge at least a portion of the aircraft fuel based upon the receipt of the single request.

12. An aircraft including:
a parachute;
a harness containing a plurality of straps that couple the parachute to a plurality of locations on the aircraft
aircraft fuel; and
a fuel discharge system operative to discharge at least a portion of the aircraft fuel, after deployment of the parachute while the aircraft is in flight, but before the aircraft contacts the earth or any object coupled to the earth;
wherein the fuel discharge system includes:
a wing that contains a fuel tank that stores the aircraft fuel, a first portion of the fuel tank being formed by a lower wing skin, a second portion of the fuel tank being formed by a panel that is coupled to the lower wing skin and separately coupled to at least one of the plurality of straps.

13. The aircraft of claim 12, wherein the panel is separately coupled to the at least one of the plurality of straps by a first cable, a pass-through assembly and a second cable.

14. The aircraft of claim 13, wherein the pass-through assembly includes a tube, a pass-through, and an o-ring that is located between the tube and the pass-through.

15. The aircraft of claim 14, wherein the tube is coupled to a wing rib that forms a third portion of the fuel tank.

16. The aircraft of claim 12, wherein the panel is coupled to the lower wing skin via an epoxy joint that includes micro.

17. The aircraft of claim 11, wherein the fuel discharge system creates a fuel discharge passageway after deployment of the parachute while the aircraft is in flight, but before the aircraft contacts the earth or any object coupled to the earth.

18. The aircraft of claim 11, further comprising:
anti-icing fluid; and
an anti-icing fluid discharge system;
wherein the aircraft is also operative to discharge at least a portion of the anti-icing fluid, based upon the receipt of the single request.

19. The aircraft of claim 11, further comprising a processor coupled to a sensor that provides the processor with data that indicates whether the parachute has been deployed.

20. The aircraft of claim 11, further comprising a ballistic parachute activation interface and a processor coupled to the ballistic parachute activation interface via a communication interface.

21. An aircraft including:
a whole-aircraft parachute;
a harness containing a plurality of straps that couple the whole-aircraft parachute to a plurality of locations on the aircraft; and
retractable landing gear;
wherein the aircraft is operative to receive a single request from an occupant of the aircraft, and based upon the receipt of the single request, both deploy the whole-aircraft parachute and also extend the landing gear.

22. A method performed by an aircraft, the aircraft including a wing, retractable landing gear, and a whole-aircraft parachute that is coupled to the aircraft, the method comprising:
- receiving a single request from an occupant of the aircraft; and
- based upon the receipt of the single request, both deploying the whole-aircraft parachute and also extending the landing gear.

23. An aircraft including:
- a whole-aircraft parachute;
- a harness containing a plurality of straps that couple the whole-aircraft parachute to a plurality of locations on the aircraft; and
- anti-icing fluid;

wherein the aircraft is operative to receive a single request from an occupant of the aircraft, and based upon the receipt of the single request, both deploy the whole-aircraft parachute and also discharge at least a portion of the anti-icing fluid from the aircraft.

24. A method performed by an aircraft, the aircraft including a wing, anti-icing fluid, and a whole-aircraft parachute that is coupled to the aircraft, the method comprising:
- receiving a single request from an occupant of the aircraft; and
- based upon the receipt of the single request, both deploying the whole-aircraft parachute and also discharging at least a portion of the anti-icing fluid from the aircraft.

* * * * *